(12) United States Patent
Wakabayashi

(10) Patent No.: US 12,483,874 B2
(45) Date of Patent: Nov. 25, 2025

(54) COMMUNICATION NETWORK NODE, USER EQUIPMENT, COMMUNICATION NETWORK, METHOD

(71) Applicant: Sony Group Corporation, Tokyo (JP)

(72) Inventor: Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 410 days.

(21) Appl. No.: 17/785,398

(22) PCT Filed: Jan. 21, 2021

(86) PCT No.: PCT/EP2021/051277
§ 371 (c)(1),
(2) Date: Jun. 15, 2022

(87) PCT Pub. No.: WO2021/151767
PCT Pub. Date: Aug. 5, 2021

(65) Prior Publication Data
US 2023/0036353 A1    Feb. 2, 2023

(30) Foreign Application Priority Data
Jan. 27, 2020 (EP) .................................... 20153824

(51) Int. Cl.
*H04W 8/02*     (2009.01)
*H04W 12/06*    (2021.01)
*H04W 12/64*    (2021.01)

(52) U.S. Cl.
CPC ............ *H04W 8/02* (2013.01); *H04W 12/06* (2013.01); *H04W 12/64* (2021.01); *G06Q 2220/00* (2013.01)

(58) Field of Classification Search
CPC ......... H04W 8/00; H04W 8/005; H04W 8/02; H04W 8/08; H04W 8/14; H04W 8/10; H04W 8/12; H04W 12/00; H04W 12/06
See application file for complete search history.

(56) References Cited

U.S. PATENT DOCUMENTS 10,593,208 B1 * 3/2020 O'Sullivan ............ G08G 1/123
2010/0304670 A1 12/2010 Shuo
(Continued)

FOREIGN PATENT DOCUMENTS

| EP | 2530631 A1 | 12/2012 |
| WO | WO-2014089576 A1 | 6/2014 |
| WO | WO-2018030349 A1 | 2/2018 |

(Continued)

OTHER PUBLICATIONS

International Search Report and Written Opinion mailed on Mar. 24, 2021, received for PCT Application PCT/EP2021/051277, filed on Jan. 21, 2021, 13 pages.
(Continued)

*Primary Examiner* — Diana J. Cheng
(74) *Attorney, Agent, or Firm* — XSENSUS LLP

(57) ABSTRACT

The present disclosure generally pertains to a communication network node having circuitry configured to: request a home mobility service provider to allow a roaming mobility service for a passenger which is located in a mobility service area of a roaming mobility service provider.

16 Claims, 9 Drawing Sheets

(56) References Cited

U.S. PATENT DOCUMENTS

| | | | |
|---|---|---|---|
| 2011/0171954 A1 | 7/2011 | Bengtsson | |
| 2019/0333054 A1 | 10/2019 | Cona | |

FOREIGN PATENT DOCUMENTS

| | | | |
|---|---|---|---|
| WO | 2019/086127 | A1 | 5/2019 |
| WO | 2019/228557 | A2 | 12/2019 |
| WO | 2020/083822 | A1 | 4/2020 |

OTHER PUBLICATIONS

Ansey et al., "Gnomon: Decentralized Identifiers for Securing 5G IoT Device Registration and Software Update", 2019 IEEE Globecom Workshops (GC KSHPS), Dec. 9, 2019, pp. 1-6.

Nokia, Discussion for proposal of a new work item "Service framework of blockchain-based verifiable identification and authentication for IoT devices", Telecommunication Standardization Sector, SG20-TD1241-R2, Study Group 20, Apr. 9-18, 2019, 17 pages.

Masih, "Vehicle Identity Technicalspecifications", XP055785686, Available Online At: https://dlt.mobi/wpcontent/uploads/2021/02/MOBI-VID0003 TS 2019-compressedandlinked.pdf., Jul. 31, 2019, 9 pages.

"Art. 4 GDPR—Definitions", General Data Protection Regulation (GDPR), Available Online At: https://gdpr-info.eu/art-4-gdpr/, Retrieved from the Internet on: May 24, 2022, 4 pages.

"Decentralized Identifier (DID)", Available Online At: https://w3c-ccg.github.io/did-primer/, 5 pages.

Microsoft, "Decentralized Identity Own and control your identity", 2018, 23 pages.

"Mobile country code", Wikipedia, Available Online At: https://en.wikipedia.org/w/index.php?title=Mobile_country_code&oldid=998859834, Retrieved from the Internet on: May 24, 2022, pp. 1-30.

"Public-key cryptography", Wikipedia, Available Online At: https://en.wikipedia.org/wiki/Public-key_cryptography, Retrieved from the Internet on: Feb. 25, 2021, 1 page.

Hardt, "The OAuth 2.0 Authorization Framework", Internet Engineering Task Force (IETF), Request for Comments: 6749, Oct. 2012, pp. 1-76.

"Social login", Wikipedia, Available Online At: https://en.wikipedia.org/w/index.php?title=Social_login&oldid=921915545, Retrieved from the Internet on: May 24, 2022, pp. 1-5.

"(GSM) European digital cellular telecommunications system (Phase 2); Functions related to Mobile Station (MS) in idle mode (GSM 03.22)", European Telecommunication Standard, European Telecommunications Standards Institute (ETSI), 650 Route Des Lucioles, Sophia Antipolis Cedex, F-06921, France, vol. SMG3, Feb. 1, 1995 (Feb. 1, 1995), XP014013589.

* cited by examiner

COMMUNICATION NETWORK NODE, USER EQUIPMENT, COMMUNICATION NETWORK, METHOD

CROSS-REFERENCE TO RELATED APPLICATIONS

The present application is based on PCT filing PCT/EP2021/051277, filed Jan. 21, 2021, which claims priority to EP 20153824.6, filed Jan. 27, 2020, the entire contents of each are incorporated herein by reference.

TECHNICAL FIELD

The present disclosure generally pertains to communication network nodes, user equipments, communication networks, and methods.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owing, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service, it is generally desirable to provide a communication network node, a user equipment, a communication network and a method for providing mobility as a service.

SUMMARY

According to a first aspect the disclosure provides a communication network node comprising circuitry configured to: request a home mobility service provider to allow a roaming mobility service for a passenger which is located in a mobility service area of a roaming mobility service provider.

According to a second aspect the disclosure provides a method for controlling a communication network node comprising: requesting a home mobility service provider to allow a roaming mobility service for a passenger which is located in a mobility service area of a roaming mobility service provider.

According to a third aspect the disclosure provides a communication network node comprising circuitry configured to: request a decentralized database to provide a credential of a passenger, wherein the credential is generated based on a decentralized identifier of the passenger, wherein the decentralized identifier is generated based on a request of a user equipment to the decentralized database for allowing the passenger to use a mobility service of a roaming mobility service provider.

According to a fourth aspect the disclosure provides a user equipment comprising circuitry configured to: issue a generation of a decentralized identifier of a passenger; and receive a credential of the passenger for allowing the passenger to use a mobility service of a roaming mobility service provider, wherein the credential is generated based on a request of a home mobility service provider to a decentralized database and based on the decentralized identifier.

According to a fifth aspect the disclosure provides a communication network for providing a distributed ledger comprising a plurality of network nodes for authenticating a passenger to a roaming mobility service provider comprising circuitry configured to: provide a decentralized identifier of the passenger in a decentralized database based on a request of a user equipment; provide a credential of the passenger in the decentralized database based on a request of a home mobility service provider and based on the decentralized identifier; and transmit the credential to the user equipment for allowing the passenger to use a mobility service of a roaming mobility service provider.

According to a sixth aspect the disclosure provides a method for controlling a communication network for providing a distributed ledger comprising a plurality of network nodes for authenticating a passenger to a roaming mobility service provider comprising: providing a decentralized identifier of the passenger in a decentralized database based on a request of a user equipment; providing a credential of the passenger in the decentralized database based on a request of a home mobility service provider and based on the decentralized identifier; and transmitting the credential to the user equipment for allowing the passenger to use a mobility service of a roaming mobility service provider.

According to a seventh aspect the disclosure provides a user equipment comprising circuitry configured to: transmit a credential of a passenger, wherein the credential is generated based on a request of a home mobility service provider to a decentralized database and based on a decentralized identifier of the passenger; receive a token, wherein the token is based on an encryption of the decentralized identifier; and decrypt the token for verifying the passenger to a roaming mobility service provider for allowing the passenger to use a mobility service of the roaming mobility service provider.

According to an eighth aspect the disclosure provides a communication network for providing a distributed ledger comprising a plurality of network nodes for authenticating a passenger to a roaming mobility service provider comprising circuitry configured to: provide a token, wherein the token is based on an encryption of a decentralized identifier of the passenger; and decrypt the token for verifying the passenger to a roaming mobility service provider for allowing the passenger to use a mobility service of the roaming mobility service provider.

According to a ninth aspect the disclosure provides a communication network node comprising circuitry configured to: allow a passenger to use a mobility service of a roaming mobility service provider based on a credential of the passenger and based on a mutual agreement of the roaming mobility service provider and a home mobility service provider, wherein the credential is generated based on a request of the home mobility service provider to a decentralized database and based on a decentralized identifier of the passenger.

According to a tenth aspect the disclosure provides a communication network node comprising circuitry configured to: store a plurality of credentials of a passenger, wherein the plurality of credentials is generated based on a request of a home mobility service provider to a decentralized database and based on a decentralized identifier of the passenger; and transmit at least one credential of the plurality of credentials to a user equipment for allowing the passenger to use a mobility service of a roaming mobility service provider.

According to an eleventh aspect the disclosure provides a method for controlling a communication network node comprising: storing a plurality of credentials of a passenger, wherein the plurality of credentials is generated based on a request of a home mobility service provider to a decentralized database and based on a decentralized identifier of the passenger; and transmitting at least one credential of the plurality of credentials to a user equipment for allowing the passenger to use a mobility service of a roaming mobility service provider.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
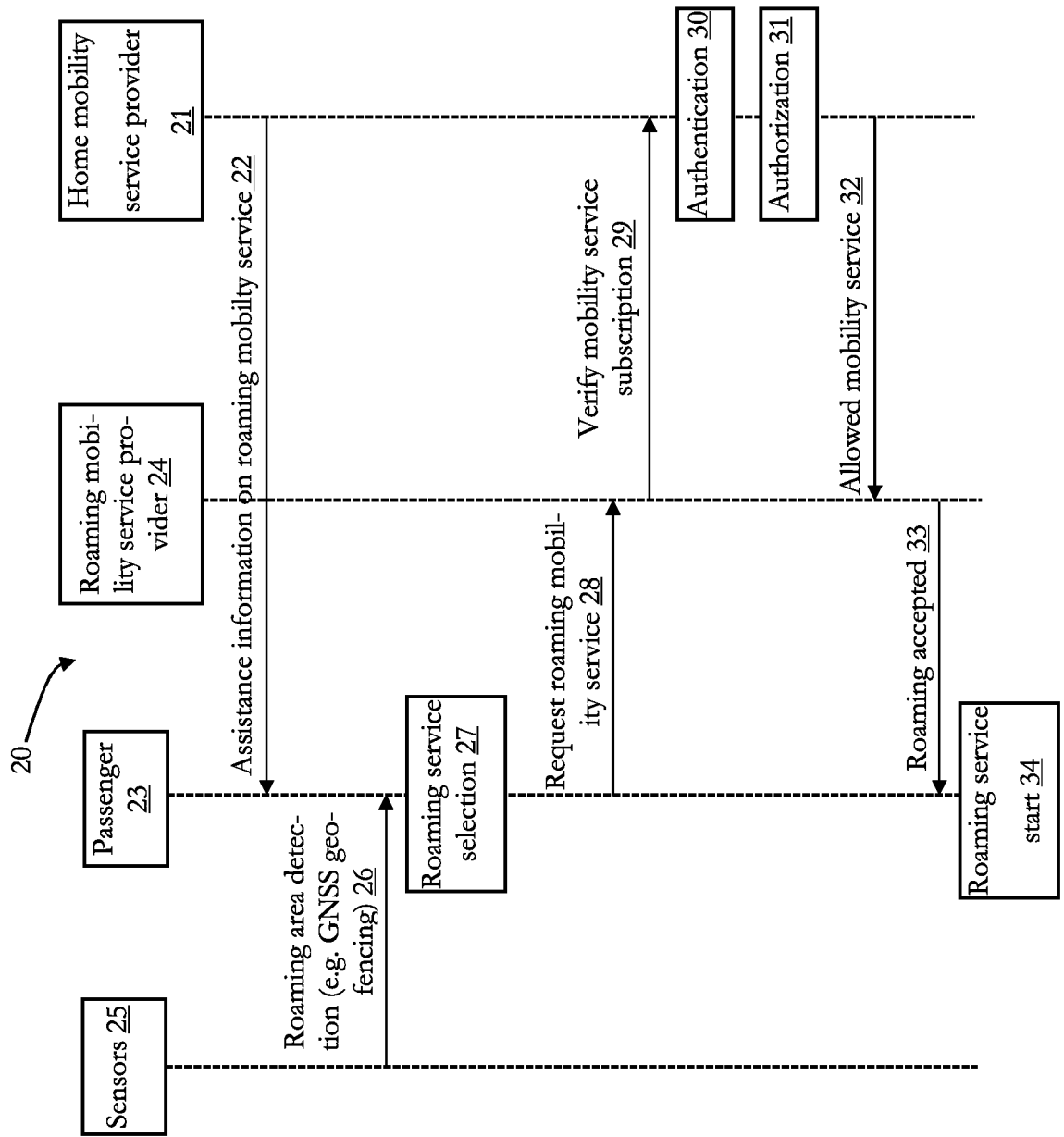
FIG. 2 depicts a roaming mobility service method according to the present disclosure.

Before a detailed description of the embodiments under reference of FIG. 2 is given, general explanations are made.

As mentioned in the outset, mobility as a service is generally known. Roaming mobility service is typically provided by one single mobility service provider. However, it has been recognized that it is desirable to increase flexibility in roaming mobility service by distributing mobility service over multiple ledgers.

It has further been recognized that it is desirable to improve convenience for a passenger who is in a foreign mobility service area at which he might not have a service subscription. In such cases, a passenger typically needs to buy a separate ticket, which may be time-intensive and expensive.

Hence, it has been recognized that it is generally desirable to provide a roaming for mobility as a service.

It has further been recognized that decentralized identifiers and self-sovereign identity may further increase a security, e.g. for personal data in such a roaming service.

In contrast to this, in some embodiments, a social login may be utilized, which may be convenient for a user. However, it has been recognized that a social login may depend too strongly on one single account, such that when a user deactivates the account temporarily or permanently, the user (or passenger) may not be able to use the services assigned to the account anymore. Moreover, personal data of the user may be bound to such an account, whereas it has been recognized that it is desirable to reduce the amount of transmitted personal data, since e.g. depending on the country at which the roaming service is used, the personal data may not be protected by a government, and the like.

Moreover, in terms of privacy, a social network service provider may know indirectly the user activity of a mobility provider's service.

Hence, as discussed, it has been recognized that a decentralized identifier may reduce dependency on such entities.

Moreover, a decentralized identifier may fulfill requirements of user control of a digital ID, privacy, personal data management, no vendor lock-in, and the like.

Furthermore, a decentralized identifier may enable to provide a roaming mobility service across countries, borders, regions, cities of different mobility service providers.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future.).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The technology of a distributed ledger and of a special example of it, namely of a blockchain, will also be discussed further below. More generally, the term distributed ledger is used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also referred to as "consortium", as will also be explained further below. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

The term "Mobility as a service (MaaS)", is also exemplarily known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like.

The term "passenger" may refer to a person who has a service contract with a home mobility service provider or which is a costumer of a home mobility service provider (defined below).

A "mobility service provider" (also referred to as "MaaS service provider") may be a superordinate term for the terms "home mobility service provider" and "roaming mobility service provider" (which are defined below), and may refer to an operator, a society, a company, and the like, which offers a mobility service in a specific mobility service area (e.g. a town, a country, a region, air route, water route).

The term "home mobility service provider" may refer to a mobility service provider being located or operating in a fixed area (e.g. country, city), and may be a mobility service provider with which a passenger may have a contract, e.g. for a pass, tickets, subscriptions, and the like. The passenger may be multiple service providers, as well, in some embodiments.

The term "roaming mobility service provider" may refer to any other mobility service provider with which a passenger has no direct contract, subscription, and the like. Thus, the passenger may use a mobility service of a roaming mobility service provider, but processes of purchasing a pass, a ticket, or using mobility service of the roaming mobility service provider may be processed via the home mobility service provider.

The term "user" may refer to a passenger who intends to use a roaming mobility service provider. The term "user" may also refer to a terminal device of a passenger (e.g. smart phone).

The term "user agent" may refer to a software, an application, and the like, being executed on a terminal device (or user equipment) of a passenger, which is configured to handle a DID (see below), a credential (see below), and the like. For example, an MaaS application (e.g. from a mobility service provider) may function as a user agent.

A decentralized identifier (DID) resolver may refer to a server (or any other information system) which retrieves a DID document of response to a verification via a DID (see below), and the like.

A credential may refer to an evidence of status, rights, membership, and the like, endorsed by an issuer, an MaaS provider, and the like. For example, a user may be able to proof (e.g. to a roaming mobility service provider) an Maas subscription membership (e.g. of a home mobility service provider) with a credential.

In some embodiments, the term "public-key cryptography" is understood as defined also in Wikipedia (https://en.wikipedia.org/wiki/Public-key_cryptography): "Public-key cryptography, or asymmetric cryptography, is any cryptographic system that uses pairs of keys: public keys which may be disseminated widely, and private keys which are known only to the owner. This accomplishes two functions: authentication, where the public key verifies that a holder of the paired private key sent the message, and encryption, where only the paired private key holder can decrypt the message encrypted with the public key." Wherein, "Two of the best-known uses of public key cryptography are: Public key encryption, in which a message is encrypted with a recipient's public key. The message cannot be decrypted by anyone who does not possess the matching private key, who is thus presumed to be the owner of that key and the person associated with the public key. This is used in an attempt to ensure confidentiality.", and, "Digital signatures, in which a message is signed with the sender's private key and can be verified by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message."

The term "personal data" may be understood in some embodiments in the sense (see exemplary https://gdpr-info.eu/art-4-gdpr/): "(1) 'personal data' means any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person;"

In some embodiments, the abbreviation AAA may refer to "Authentication, Authorization, and Accounting" in a computer network or in a network service, as it is generally known as a security framework for an information and communication technology (ICT).

Authentication may refer to a checking whether a user (or in the context of the present disclosure a passenger) is a legitimate user of the network, network service, or system. For example, an MaaS servicer (e.g. a mobility service provider, a transport operator) may check a user/passenger identification and a status of a service subscription when the user/passenger intends to use the MaaS service.

Authorization may refer to a checking which specific service (or services) an authenticated user/passenger is allowed to use. For example, an MaaS servicer may check a contract type, a service type, and the like, of the user and may determine the allowed service of the user/passenger. For example, the user/passenger may be allowed to use a train service, but not a taxi service, such that a use of a train may be permitted, whereas a use of a taxi may be denied.

Accounting may refer to a recoding of a recording of the user's/passenger's behavior and/or his used service(s) (e.g. how long he uses a service, how often he uses a service, and the like). For example, a passenger if a passenger uses an MaaS service, such as a booking, a riding, and the like, a record of this may be stored.

In some embodiments, an authorization framework may be utilized, such as OAuth, Oauth 2.0, and the like, as it may be known from Internet Engineering Task Force (IETF) Request for Comments (RFC) 6749.

Such an authorization framework may be used in a third party application. For example, an application of a terminal device (e.g. smartphone) may reuse a social network service (SNS) account for the third party's server access. An authorization server may then execute an authorization instead of the third party and provide a token, such that the (client) application may be allowed to access protected data with the provided token, as will be further discussed with reference to FIG. 1, which depicts a simplified OAuth 2.0 protocol. For further details, it is referred to the following domain: https://tools.ietf.org/html/rfc6749.

Figure 1:
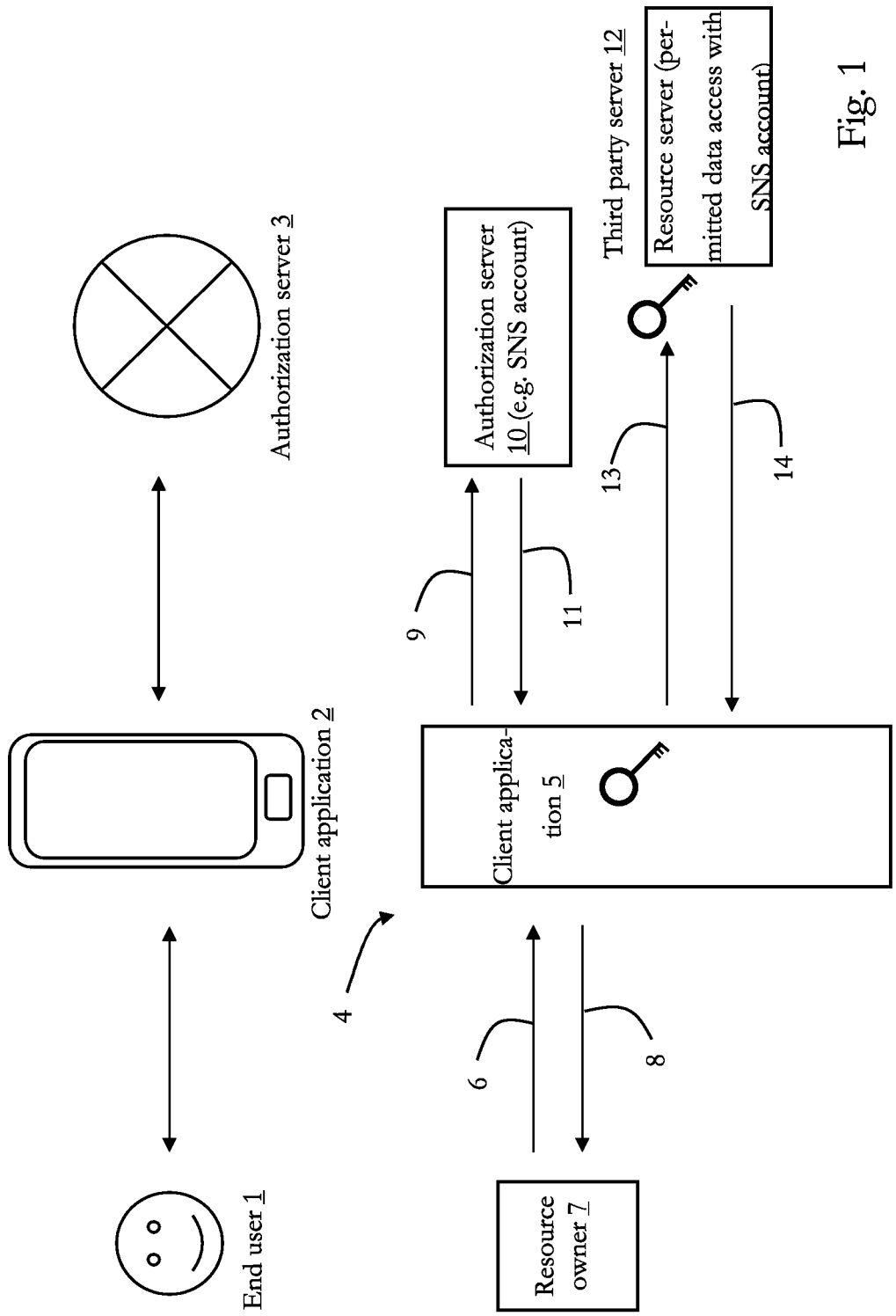
FIG. 1 depicts an OAuth protocol as it is generally known.

On the top of FIG. 1, a connection of an end user 1 using a client application 2 is depicted, wherein the client application accesses an authorization server 3.

On the bottom of FIG. 1, an authorization method 4 is depicted. A client application 5 (which may be the same as the client application 2) inquires, at 6, a resource owner 7 (e.g. the end user 1) of permission for reuse of an account.

At 8, the resource owner 7 allows the reuse, such that, at 9, the client application 5 provides an authorization grant to an authorization server 10, at which an SNS account is stored.

At 11, the authorization server sends an access token for an access of a third party server 12, which is a resource server storing protected data.

The client application 5 requests, at 13, the protected data with the received access token from the third party server 12.

At 14, the third party server 12 sends the requested data to the client application 5.

To such a method, as discussed under FIG. 1, it may also be referred to as social login (see also https://en.wikipedia.org/wiki(Social_login)). A social login may provide an authorization of a third party's service with a common SNS account.

Some embodiments pertain to a communication network node having circuitry configured to: request a home mobility service provider to allow a roaming mobility service for a passenger which is located in a mobility service area of a roaming mobility service provider.

The communication network node may be a computer, a server, a terminal device, and the like. Moreover, multiple of such components (e.g. several servers, which may also be coupled to terminal devices, and the like) may be envisaged.

A request may be issued in response to a detection of the passenger in a mobility service area of a roaming mobility service provider.

Further explanations are now made with reference to FIG. 2.

FIG. 2 depicts a roaming mobility service method 20 according to the present disclosure.

A home mobility service provider 21 sends, at 22, assistance information of roaming mobility service to a passenger 23 for preparation of a roaming mobility service. Assistance information include, in this embodiment, a name of a roaming mobility service provider 24 and mobility service areas of the roaming mobility service provider 24.

For a detection of the roaming mobility service, sensors 25 (e.g. a GNSS sensor) of a mobile phone of the passenger 23 detect, at 26, that the passenger 23 enters a predefined zone (e.g. via geo-fencing).

Further, the passenger 23 selects, at 27, the roaming mobility service with a user interface of the mobile phone at which a corresponding application is displayed.

At 28, the application on the mobile phone causes a request for a roaming mobility service to the roaming mobility service provider 24.

For authentication/authorization of the user to use the mobility service of the roaming mobility service provider 24, the roaming mobility service provider 24 sends, at 29, a request to the home mobility service provider 21 to verify a subscription of service of the passenger 23 at the home mobility service provider 21.

Thereupon, the home mobility service provider 21 checks whether a user account of the passenger 23 exists, thereby checking authentication at 30.

Furthermore, the home mobility service provider 21 checks the allowed services of the roaming mobility service, thereby checking authorization at 31.

At 32, the home mobility service provider 21 sends the allowed mobility service(s) of the passenger 23 to the roaming mobility service provider 24.

At 33, the roaming mobility service provider 24 transmits to the passenger 23 that the roaming is accepted, such that, at 34, the roaming mobility service provider 24 starts the roaming service in line with the received result.

The detection may be based on at least one of a mobile country code (MCC), geo-fencing, an external trigger, and a booking history.

An MCC may be provided by a mobile phone network, for example, and may indicate in which country or area in which a terminal device (e.g. mobile phone) may be located. Such a mobile network may transmit (or broadcast) the MCC, and when the terminal device is in an operation state, the terminal device may be configured to receive the MCC and identify the country, in which it is located.

A terminal device may be configured to detect, based on the received MCC, that a user (e.g. owner of the terminal device) is in another country than his home country. A relevant MaaS client application (e.g. of a local mobility service provider in the current country) may be launched on the terminal device, and the terminal device may be configured to inform a mobility service provider, thereby requesting a roaming mobility service of the local mobility service provider, such that the local mobility service provider becomes a roaming mobility service provider of the user.

Geo-fencing may be based on a terminal device's positioning function. In some embodiments, a terminal device may use a global navigation satellite system (GNSS), such that it may be configured to determine a position of a user.

A home mobility service provider may provide a geo-location database to the terminal device, wherein such a database may include allowed roaming service areas. If the user (or the terminal device) is in an allowed roaming service area, the terminal device may trigger a launch of a relevant MaaS application, as discussed above.

An external trigger may refer to a beacon signal, such as a Bluetooth beacon, a Bluetooth low energy (BLE) beacon, a near field communication (NFC) signal, and the like.

For example, trigger points may be provided, for example at a boarding gate, a railway station, a gateway of a country, area, zone, and the like, wherein a trigger point may be configured to emit one or more beacon signals, without limiting the present disclosure to the above-mentioned beacon signals (e.g. a Wi-Fi signal may also be considered sufficient).

If the passenger (user) is sufficiently close to a trigger point, such that a terminal device of the passenger can receive a beacon signal, the terminal device may be configured to determine the country, area, zone, and the like, based on the beacon signal.

Alternatively or additionally, the terminal device may be configured to request further information. For example, the terminal device may send a message (e.g. SMS) requesting a roaming mobility service provider. Such an embodiment may be envisaged when an energy of a received beacon signal is below a predetermined threshold, a volume of information in a beacon is limited, and the like.

A booking history may refer to a tracking of previous bookings of the passenger. For example, a roaming mobility service provider may save a travel record of the passenger (e.g. air travel to go abroad). For example, the passenger may book a flight, a rail travel, and the like, with the roaming mobility service provider. The roaming mobility service provider may store this booking as a booking record in an application on the passenger's terminal device. At the time/date of the booked travel, the application may start a roaming mobility service.

It has been recognized that a social login may be applicable for an MaaS roaming service.

Thus, in some embodiments, the circuitry is further configured to perform a social login to the roaming mobility service provider.

However, in some embodiments, a social login may not be suitable for an MaaS service. For example, the social login may rely on an identifier, which is provided by a specific company, such that the company may (directly or indirectly) know each request of the passenger to use an MaaS service. Hence, for privacy reasons and from an MaaS service provider point of view, an access of a travel record may need to be restricted for a third party.

It has, thus, been recognized that it is possible to control an MaaS identifier by an individual, decentralized issuer.

Hence, in some embodiments, the identifier is a decentralized identifier.

A decentralized identifier (DID) may provide a decentralized public key infrastructure (DPKI). A definition of a DID may be found, for example, by World Wide Web Consortium (W3C) as a decentralized global unique ID (see also https://w3c-ccg.github.io/did-primer/and/or https://query-.prod.cms.rt.microsoft.com/cms/api/am/binary/RE2DjfY)

In some embodiments, such a decentralized identifier is used for verifying, identifying, authorizing, authenticating a passenger to a mobility service provider.

A DID may, for example, be used for providing a self-sovereign identity, and thus, in some embodiments, the identifier is a self-sovereign identity.

An SSI may be defined as a lifetime portable digital identity that does not depend on any centralized authority, which further may fulfill the requirements of persistence, global resolvability, cryptographic verifiability, and decentralization (see also https://w3c-ccg.github.io/did-primer/).

Hence, while a conventional identity may be provided by a centralized entity or authority (e.g. a government), and SNS service provider, there is no need for such an authority in the case of SSI.

A common SSI standard may be used, such as Hyperledger Indy, and may be applied to a MaaS roaming service according to the present disclosure.

Figure 3:
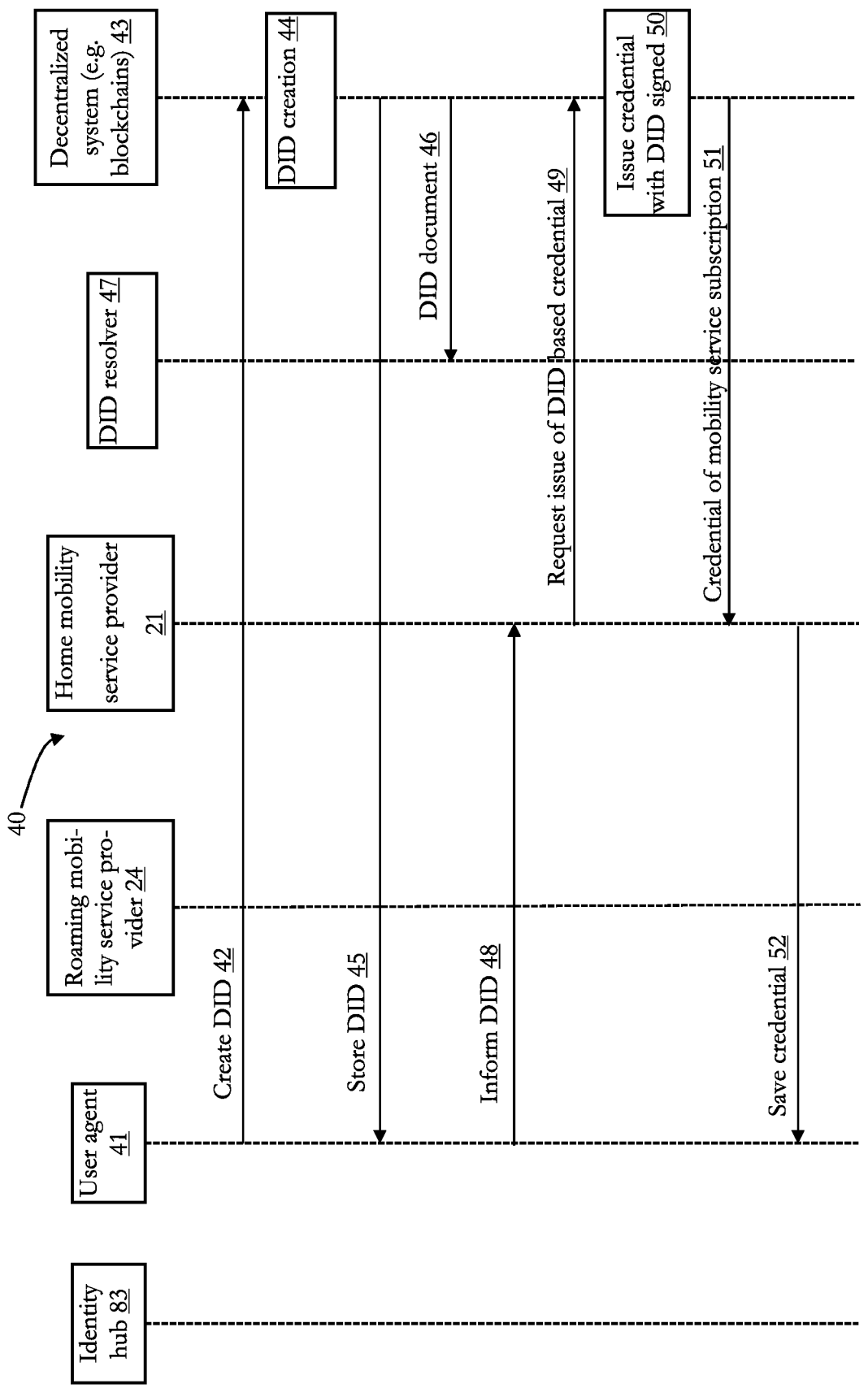
FIG. 3 depicts a method for authenticating a passenger to use a mobility service of a roaming mobility service provider.

FIG. 3 depicts a method 40 for authenticating the passenger 23 to use a mobility service of the roaming mobility service provider 24.

For a preparation of a decentralized identifier (DID), a user agent 41 (e.g. provided in an application of the passenger's mobile phone) issues a creation of a DID, at 42, with a decentralized system 43 (or decentralized database, e.g. blockchains, distributed ledger system). The DID is, in this embodiment, a unique number (in other embodiments a global unique address of the passenger), such that needed information for authenticating the passenger is minimized.

At 44, the DID is created and stored by the user agent 41, at 45.

At 46, a DID document is transmitted to a DID resolver 47.

Then, a credential is prepared by the home mobility service provider 21.

At 48, the user agent informs the home mobility service provider 21 about the DID.

At 49, the home mobility service provider 21 requests an issue of a credential based on the DID (in other embodiments, a credential issuer may be different from the home mobility service provider 21). The request is sent to the decentralized system 43.

At 50, the decentralized system 43 issues a credential which is signed with the DID to prove that the passenger is a subscriber of a mobility service of the home mobility service provider 21. Hence, the DID and the credential are both stored in the decentralized system 43.

The signing is, in this embodiment, performed via a hashing of the DID and a consecutive public-key encryption based on the generated hash.

The credential is transmitted to the home mobility service provider 21, at 51, which transmits is to the user agent 41, at 52.

Some embodiments pertain to a communication network node having circuitry configured to: request a decentralized database to provide a credential of a passenger, wherein the credential is generated based on a decentralized identifier of the passenger, wherein the decentralized identifier is generated based on a request of a user equipment to the decentralized database for allowing the passenger to use a mobility service of a roaming mobility service provider.

With respect to FIG. 3, the communication network node may be controlled by the home mobility service provider 21.

Some embodiments pertain to a user equipment having circuitry configured to: issue a generation of a decentralized identifier of a passenger; and receive a credential of the passenger for allowing the passenger to use a mobility service of a roaming mobility service provider, wherein the credential is generated based on a request of a home mobility service provider to a decentralized database and based on the decentralized identifier.

The user equipment (e.g. smartphone, smartwatch, and the like) may be configured to run an application, thereby providing a functionality of the user agent 41 of FIG. 3.

Some embodiments pertain to a communication network for providing a distributed ledger having a plurality of network nodes for authenticating a passenger to a roaming mobility service provider having circuitry configured to: provide a decentralized identifier of the passenger in a decentralized database based on a request of a user equipment; provide a credential of the passenger in the decentralized database based on a request of a home mobility service provider and based on the decentralized identifier; and transmit the credential to the user equipment for allowing the passenger to use a mobility service of a roaming mobility service provider.

The communication network, as for example discussed with respect to FIG. 3, may include a plurality of servers, computers, user equipment, and the like.

Some embodiments pertain to a method for controlling a communication network for providing a distributed ledger having a plurality of network nodes for authenticating a passenger to a roaming mobility service provider having: providing a decentralized identifier of the passenger in a decentralized database based on a request of a user equipment; providing a credential of the passenger in the decentralized database based on a request of a home mobility service provider and based on the decentralized identifier; and transmitting the credential to the user equipment for allowing the passenger to use a mobility service of a roaming mobility service provider, as discussed herein.

It should be noted that embodiments of the present disclosure generally also pertain to methods being carried out by respective circuitry, control, network nodes, and the like, and the skilled person may provide mutatis mutandis a corresponding method for each of such embodiments.

Figure 4:
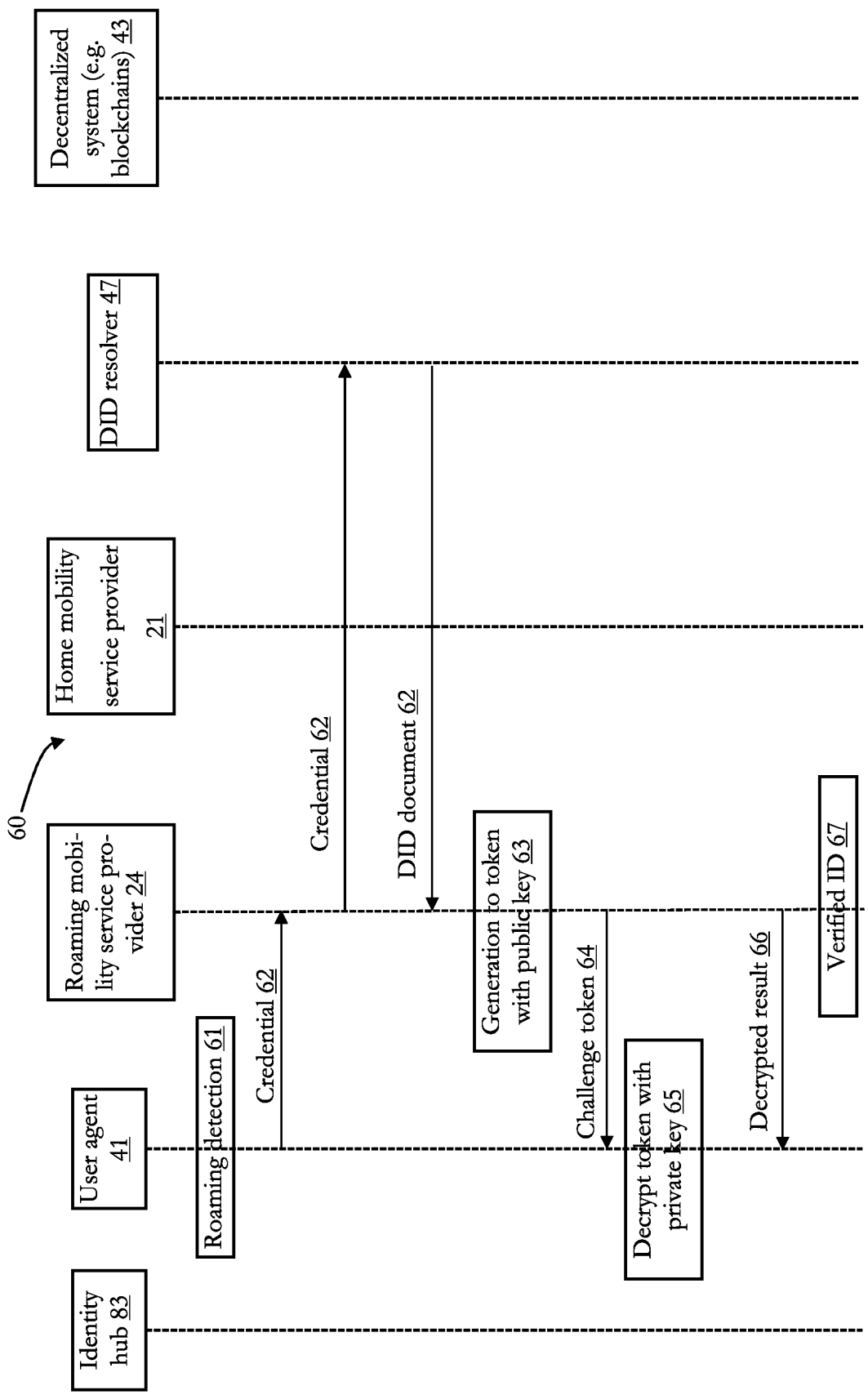
FIG. 4 depicts a further embodiment of a method for authenticating a passenger.

FIG. 4 depicts a further method 60 for authentication of passenger based on a DID based credential. The method 60 may be carried out after the method 40 of FIG. 3 or may be considered as a standalone method, as well.

At 61, the user agent 41 detects an entering of a mobility service area of the roaming mobility service provider 24, such that the roaming is initiated.

The user agent 41 transmits, at 62, the credential to the roaming mobility service provider 24, which triggers an authentication process.

The roaming mobility service provider sends the DID signed credential to the DID resolver 47 (server).

The DID resolver 47 transmits the DID document to the roaming mobility service provider. Additionally to the sole DID, the DID document includes a public key of the user for performing a public-key encryption of the DID for generating a token, at 63. A terminal for a validity check of the roaming mobility service provider may store the DID and the public key after the initial process (i.e. the first time of performing such a method 60). If the DID and the public key are stored, a repetitive execution of this process may be omitted at a later stage of performing the method 60, without limiting the present disclosure in that regard. The stored data (i.e. DID and/or public key) may be valid for a predetermined time (e.g. one day). Generally, the DID and the public key may be valid for a different or the same amount of time. Thereby, an offline operation (e.g. an operation without network connection) may be possible, which may be envisaged when the remaining process does not necessarily need a network connection.

As it is generally known in public-key cryptography, a private key is necessary to decrypt the token. The private key is stored in the user agent 41.

The token (or challenge token) is transmitted to the user agent 41, at 64, and at 65, the user agent decrypts the token with the private key.

The decrypted result is then transmitted to the roaming mobility service 24 provider, at 66, such that the roaming mobility service provider recognizes, at 67, that the user is a verified user for using a mobility service of the roaming mobility service provider 24 in that the decrypted token is the same token as he generated.

Hence, some embodiments pertain to a communication network node having circuitry configured to: receive a credential of a passenger, wherein the credential is generated based on a request of a home mobility service provider to a decentralized database and based on a decentralized identifier of the passenger; receive the decentralized identifier in response to transmitting the credential to a database; verify the passenger based on the decentralized identifier for allowing the passenger to use a mobility service of a roaming mobility service provider.

Such a network node may, for example, be controlled by a roaming mobility service provider, as discussed under reference of FIG. 4.

In some embodiments, the verifying is based on a token, as discussed herein.

In some embodiments, the token is generated based on a public key encryption of the decentralized identifier, as discussed herein.

It should be noted that the present disclosure is not limited to public-key cryptography as any other kind of symmetric or asymmetric cryptography may be envisaged by the skilled person.

Some embodiments pertain to a method for controlling a communication network node including:

receiving a credential of a passenger, wherein the credential is generated based on a request of a home mobility service provider to a decentralized database and based on a decentralized identifier of the passenger; receiving the decentralized identifier in response to transmitting the credential to a database; verifying the passenger based on the decentralized identifier for allowing the passenger to use a mobility service of a roaming mobility service provider.

Some embodiments pertain to a user equipment having circuitry configured to: transmit a credential of a passenger, wherein the credential is generated based on a request of a home mobility service provider to a decentralized database and based on a decentralized identifier of the passenger; receive a token, wherein the token is based on an encryption of the decentralized identifier; and decrypt the token for verifying the passenger to a roaming mobility service provider for allowing the passenger to use a mobility service of the roaming mobility service provider.

Such a user equipment may be realized, e.g. by a smartphone and the like, functioning as a user agent, as discussed with respect to FIG. 4.

Some embodiments pertain to a communication network for providing a distributed ledger having a plurality of network nodes for authenticating a passenger to a roaming mobility service provider having circuitry configured to: provide a token, wherein the token is based on an encryption of a decentralized identifier of the passenger; and decrypt the token for verifying the passenger to a roaming mobility service provider for allowing the passenger to use a mobility service of the roaming mobility service provider, as discussed herein, also with respect to FIG. 4.

In some embodiments, the distributed ledger is based on a blockchain, as discussed herein.

Some embodiments pertain to a method for controlling a communication network for providing a distributed ledger having a plurality of network nodes for authenticating a passenger to a roaming mobility service provider having: providing a token, wherein the token is based on an encryption of a decentralized identifier of the passenger; decrypting the token for verifying the passenger to a roaming mobility service provider for allowing the passenger to use a mobility service of the roaming mobility service provider, as discussed herein.

In some embodiments, the sole authentication may not be considered sufficient for allowing a passenger to use a roaming mobility service.

Hence, for safety and/or security reasons, additionally an authorization of the passenger is envisaged. For example, this may be compared with a passport control at an airport. For authenticating a passenger, it may be sufficient to check the passport. However, for authorizing the passenger to enter a country, a valid visa may be required.

Analogously, according to the present disclosure, in some embodiments, an authorization is performed.

In some embodiments, there is a mutual agreement between a home mobility service provider and a roaming mobility service provider for allowing a passenger to use mobility service of the roaming mobility service provider. The mutual agreement may include that the passenger is supposed to show a credential of the home mobility service provider for proving he has a mobility service subscription. In this embodiment, the passenger already has a DID.

The credential may include the following information: Issuer (home mobility service provider), servicer (roaming mobility service provider or transport service provider), service information (e.g. the allowed service (e.g. public transport in zone 1-3)), validity information (e.g. timestamp of the issue date, validity period, expiry date, PKI (public key infrastructure) information (e.g. signature)).

Figure 5:
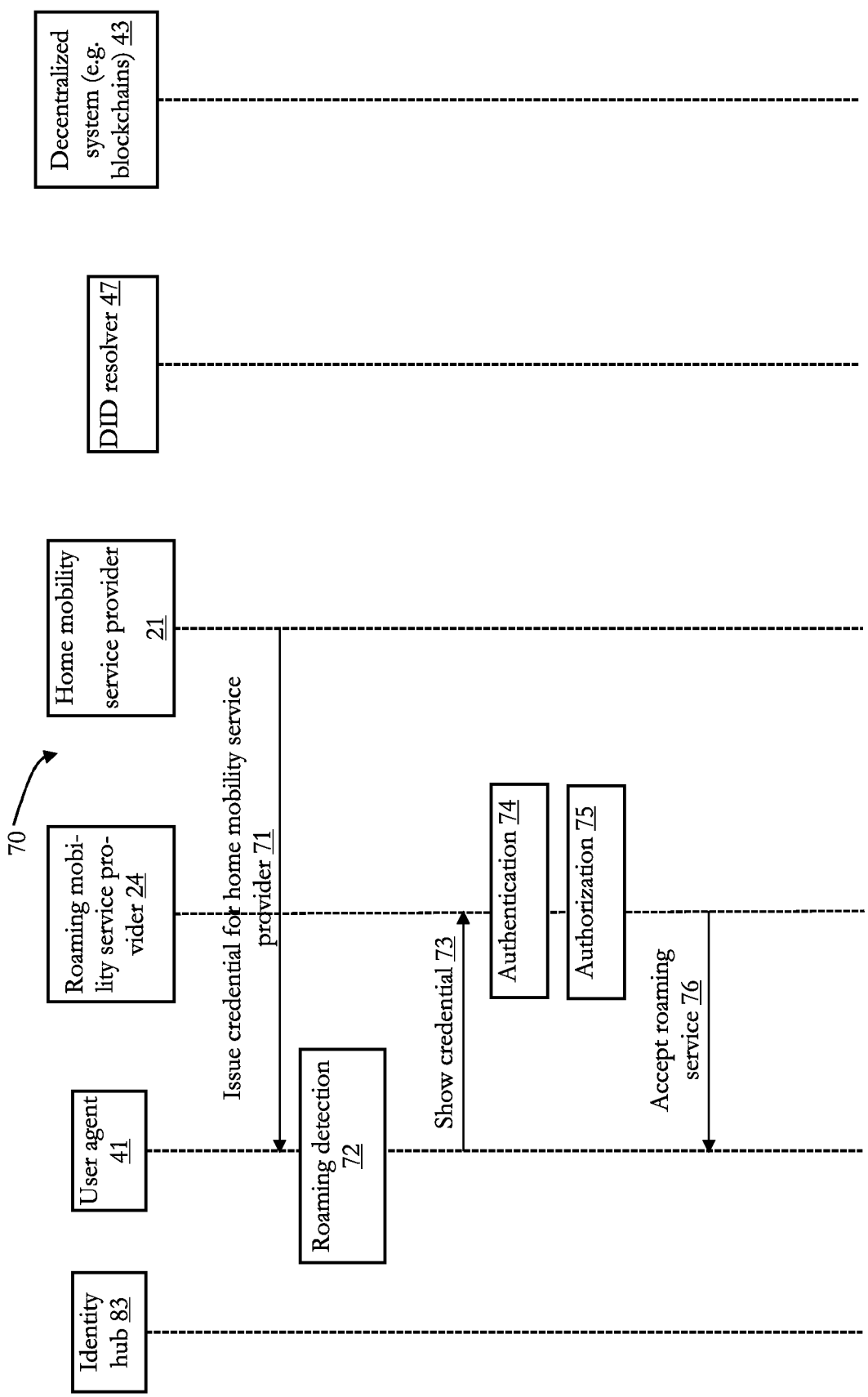
FIG. 5 depicts a method for authorizing a passenger with a single mobility service credential and mutual agreements.

FIG. 5 depicts a method 70 for authorizing a passenger with a single mobility service credential under mutual agreements.

At 71, the home mobility service provider 21 issues and transmits a credential for home mobility service to the user agent 41. The credential can be used for a roaming mobility service provider under mutual agreements.

At 72, the user agent 41 (e.g. a mobility service application on a smartphone) detects an entering of a roaming mobility service area (i.e. a mobility service area of a mobility service provider which is not the passenger's home mobility service provider 21) and starts a roaming.

The user agent 41 transmits the credential to the roaming mobility service provider 24, at 73.

At 74, the passenger is authenticated, as discussed above.

At 75, an authorization is performed as follows:

Firstly, the roaming mobility service provider 24 checks the credential and the validity based on an electronic signature from the home mobility service provider 21. Secondly, roaming mobility service provider 24 reads the service conditions provided in the credential and, thirdly, allows the passenger to use the mobility service of the roaming mobility service provider according to the conditions in the credential.

Hence, some embodiments pertain to a communication network node comprising circuitry configured to: allow a passenger to use a mobility service of a roaming mobility service provider based on a credential of the passenger and based on a mutual agreement of the roaming mobility service provider and a home mobility service provider, wherein the credential is generated based on a request of the home mobility service provider to a decentralized database and based on a decentralized identifier of the passenger, as discussed with respect to FIG. 5.

The network node may, in some embodiments, be controlled according to the roaming mobility service provider.

Some embodiments pertain to a method for controlling a communication network node comprising: allowing a passenger to use a mobility service of a roaming mobility service provider based on a credential of the passenger and based on a mutual agreement of the roaming mobility service provider and a home mobility service provider, wherein the credential is generated based on a request of the home mobility service provider to a decentralized database and based on a decentralized identifier of the passenger, as discussed herein.

However, the present disclosure is not limited to an authorization according to FIG. 5, as it may be envisaged to have mutual credentials, and, thus, mutual mobility service agreements. Each credential may be based on a specific request.

For example, among different mobility service providers, the service levels, terms, conditions, and the like, may be different. For example, a passenger may use a full service of the home mobility service provider, but not of the roaming mobility service provider. Moreover, there may be different transport operators assigned to the roaming mobility service provider (e.g. taxi and train), and the passenger may only be allowed to use one of them. Hence, separate credentials may be required for different operators.

For example, a transport operator A (railway company) may need credential A with the conditions of railway use and transport operator B (taxi company) may need credential B with the conditions of taxi use.

A credential may include the following information: Issuer (e.g. home mobility service provider), servicer (e.g. roaming mobility service provider, transport operator), service information (e.g. service type (e.g. taxi, railway), allowance of service (e.g. within ten with taxi, four times per railway ticket)), validity information (e.g. timestamp of the issue date, validity period, expiry date, PKI information (e.g. e-signature)).

Figure 6:
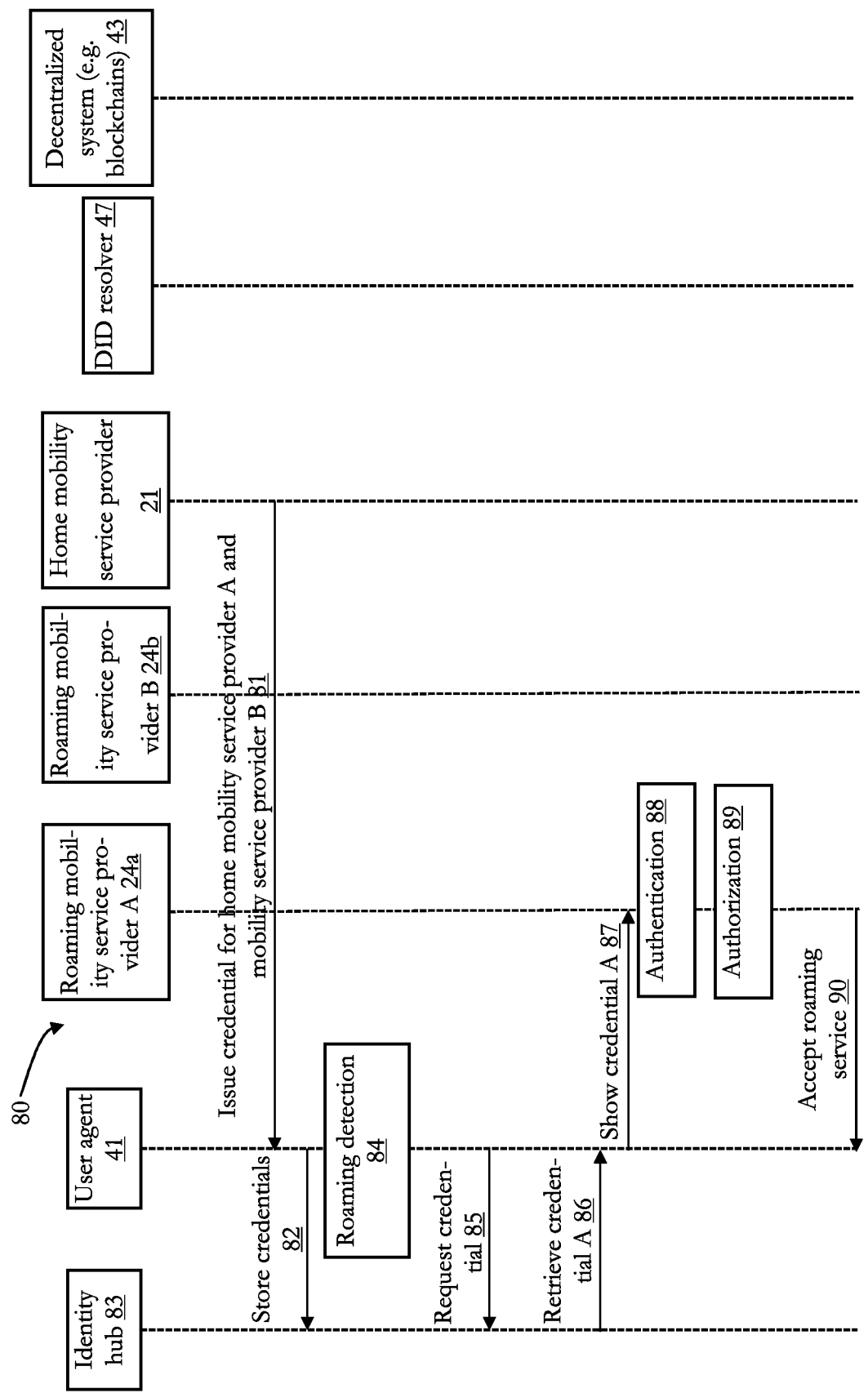
FIG. 6 depicts a method for authorizing a passenger in the case of multiple credentials.

FIG. 6 depicts a method 80 for further explaining the case of multiple credentials for authorizing a passenger.

Based on a passenger request for using a mobility service of a roaming mobility service provider which is issued to the home mobility service provider, the home mobility service provider transmits a credential for the roaming mobility service provider A 24a and a credentials for the roaming mobility service provider B 24b to the user agent 41.

The user agent transmits the credentials to an identity hub 83 (e.g. a server, storage), on which they are stored, at 82.

At 84, a roaming detection is carried out by the user agent 41, as discussed herein. The result of the roaming detection is that the passenger intends to use mobility service of the roaming mobility service provider A 24a Based on the roaming detection, the user agent 41 requests the corresponding credential at the identity hub 83, at 85, which transmits the credential A at 86 to the user agent 41.

At 87, the user agent 41 shows/sends the relevant credential to the roaming mobility service provider A 24a for authenticating the passenger which happens at 88.

For authorization, at 89, the roaming mobility service provider A 24a verifies the credential with a distributed system (e.g. blockchain). Moreover, the roaming mobility service provider A 24a checks the allowance of mobility service. In some embodiments, an allowance history (or change of remaining allowance) may be recorded in the user agent, in a distributed ledger, a decentralized system, and the like. For example, the user agent may have a secure memory which may not be easy to write/update without an access right or permission. The user agent may be configured to check a remaining allowance if a user (or passenger) requests an allowance based mobility service (or transport service). Moreover, such a mechanism may be applied to a related service, such as a recording of a travel mirage, a recording of estimated volume of carbon dioxide emission based on a type of mobility service (e.g. train, plane, and the like), or the like.

At 90, the roaming service is accepted and the passenger can start the roaming service.

Thus, some embodiments pertain to a communication network node comprising circuitry configured to: store a plurality of credentials of a passenger, wherein the plurality of credentials is generated based on a request of a home mobility service provider to a decentralized database and based on a decentralized identifier of the passenger; and transmit at least one credential of the plurality of credentials to a user equipment for allowing the passenger to use a mobility service of a roaming mobility service provider.

The network node may be configured of or controlled by an identity hub, as discussed with respect to FIG. 6.

Some embodiments pertain to a method for controlling a communication network node including: storing a plurality of credentials of a passenger, wherein the plurality of credentials is generated based on a request of a home mobility service provider to a decentralized database and based on a decentralized identifier of the passenger; transmitting at least one credential of the plurality of credentials to a user equipment for allowing the passenger to use a mobility service of a roaming mobility service provider, as discussed herein.

The method may be performed by a server, a computer, and the like, such as an identity hub as discussed under reference of FIG. 6

In the following a blockchain and its general data structure will be explained under reference of FIG. 7. In this embodiment of a blockchain, features are a network/topology, a consensus algorithm a Hash function, participant authentication, a scalability/block structures and performance.

Figure 7:
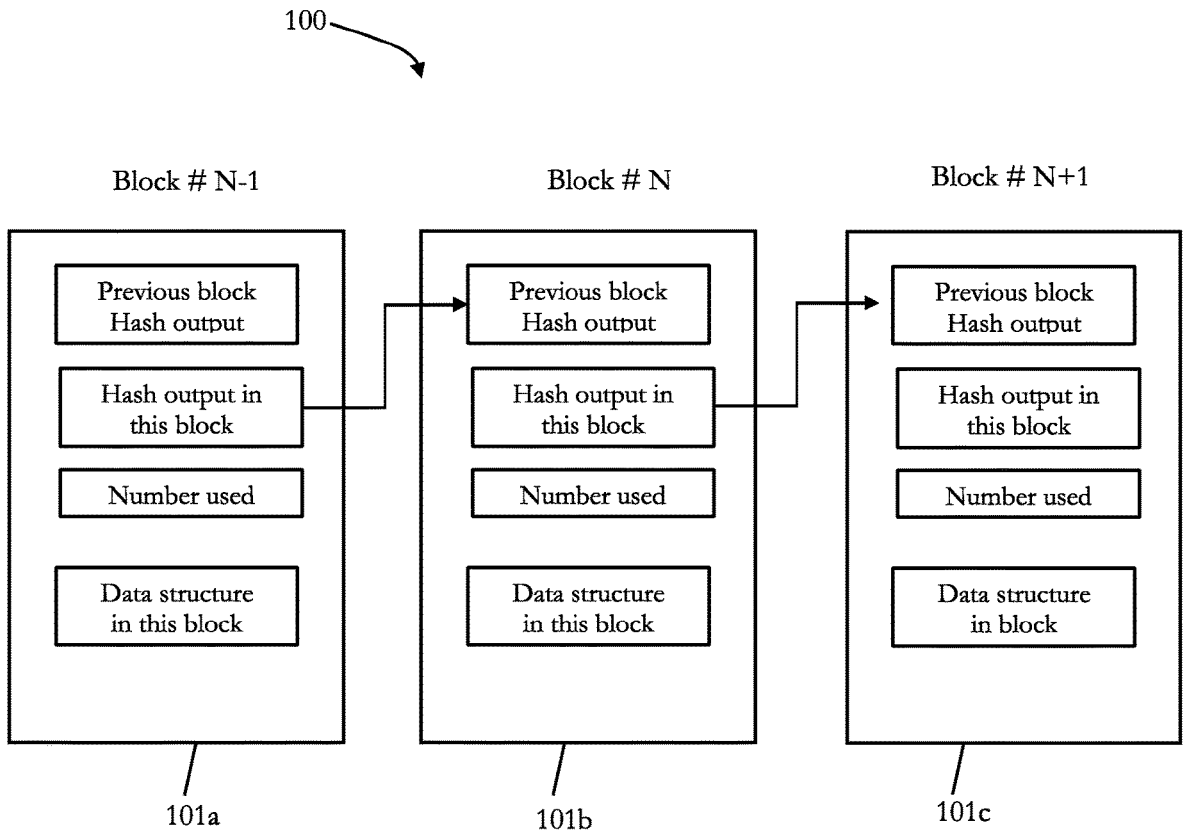
FIG. 7 illustrates a general structure of a blockchain.

FIG. 7 illustrates a general structure of a blockchain 100. The blockchain 100 includes a chain of multiple data blocks 101a, 101b and 101c, wherein the block 101b is a current block (Block #N), the block 101a is a previous block (Block #N−1) and the block 101c is a future or successor block (Block #N+1). Each block includes a hash function result of a previous block, a main data structure, an input value for hash function and hash function result of the current block, wherein the hash function result of current block (101b) is always used as input to the next block (101c).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 101a, 101b and 101c. The blockchain 100 is an example of a distributed ledger, which may be used, for example, for providing MaaS in some embodiments.

Figure 8:
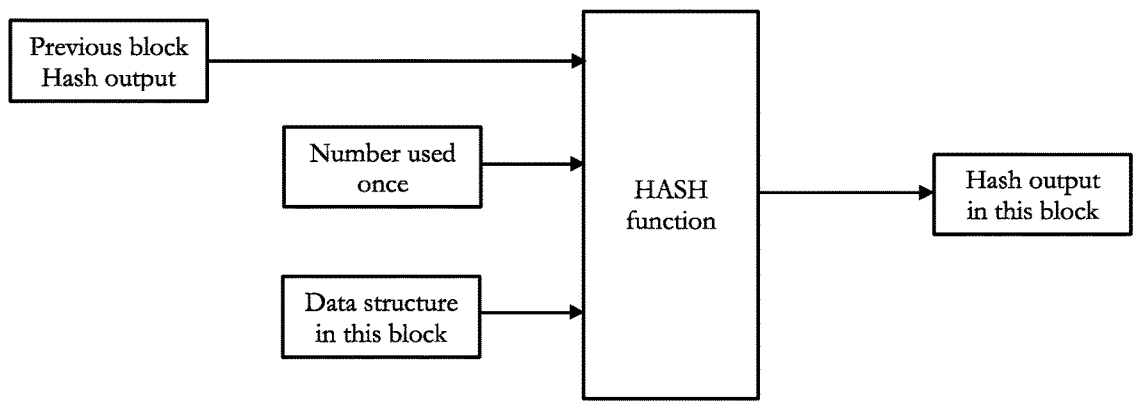
FIG. 8 illustrates the input and output of a hash function for a blockchain.

FIG. 8 illustrates the input and output of a hash function, which is used, for example, for the blockchain 100 of FIG. 7.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The inputs for the hash function are a previous hash output, the number used once and the main body of data in the current block (e.g. block 101b in FIG. 7). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BFT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 9:
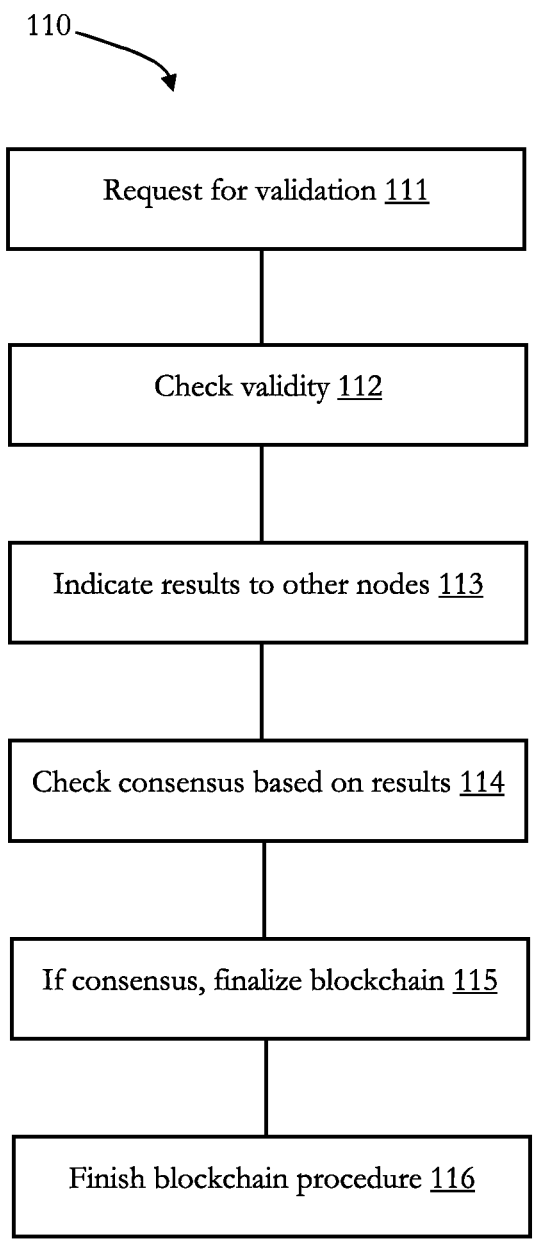
FIG. 9 exemplarily illustrates the process of PBFT.

FIG. 9 exemplary illustrates the process 110 of PBFT.

A leader node (it also called non-validating peer) requests at 111 other nodes to validate the blockchain. At 112, each requested node (validate peer) checks the validity of the blockchain with a hash function and indicates its result to other nodes at 113. At 114, a node receives the validity results from multiple other peers and checks the consensus of the blockchain, if it receives more valid results than a pre-defined criteria. If there is a consensus, at 115, the node writes/finalizes the blockchain. A leader peer checks the overall progress of the validity check in other nodes and finishes at 116 the blockchain procedure.

For resilience, the total number of nodes is more than 3f+1 in some embodiments, wherein f is the number of allowed failure nodes. For example, f=1, there is a total 4 nodes; if f=3, there is a total of 10 nodes, etc.

In some embodiments, the PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 10:
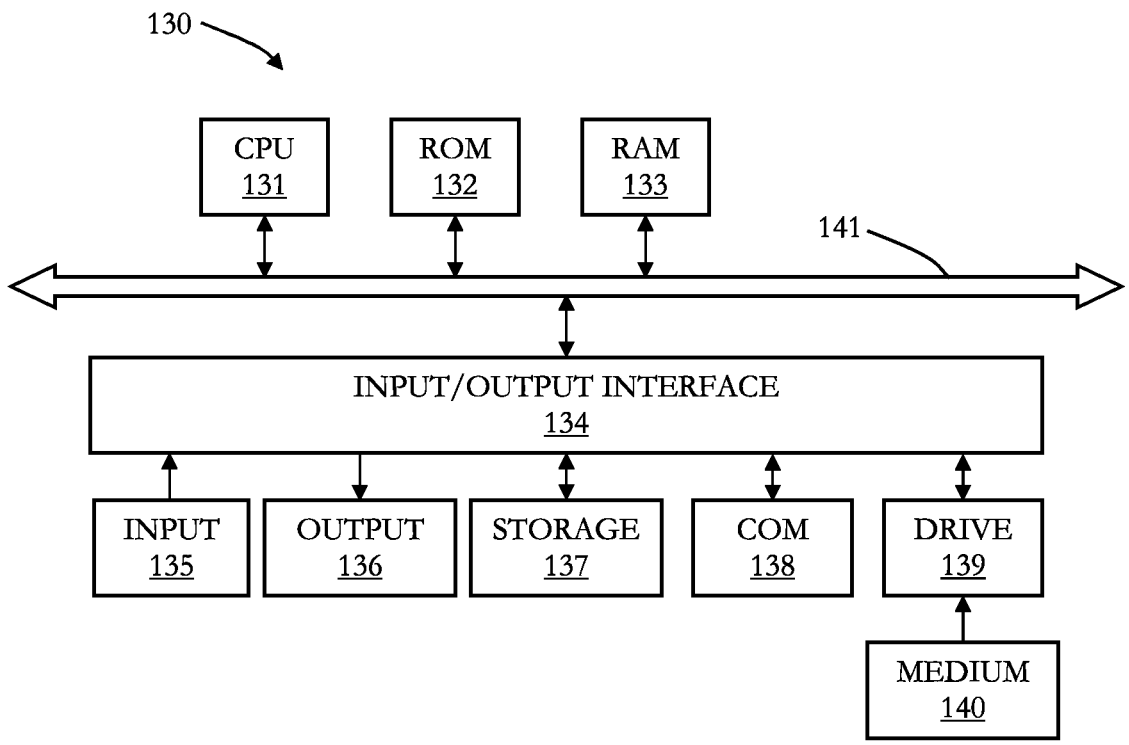
FIG. 10 depicts an embodiment of a general purpose computer.

In the following, an embodiment of a general purpose computer 130 is described under reference of FIG. 10. The computer 130 can be implemented such that it can basically function as any type of network equipment, e.g. a network node, an identity hub, a part of a decentralized database, a base station or new radio base station, transmission and reception point, or communication device, such as user equipment, (end) terminal device or the like. The computer 130 has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

In addition or alternatively to the storage 137, the hardware may have a secure memory for storing the credential. Special software which has a right to access the secure memory can change the contents of secure memory. For example, a process of reading/writing/updating the credential may be protected by a software (execution) (either the same software or a different software). Hence, a risk of tampering the credential (or any other content of the secure memory), e.g. by a malicious software, an accidental updating/deleting (by an error, flaw or fault of the software) or the like may be prohibited. Such a secure hardware/software may be known as trusted execution environment (TEE) or the root of trust.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 11:
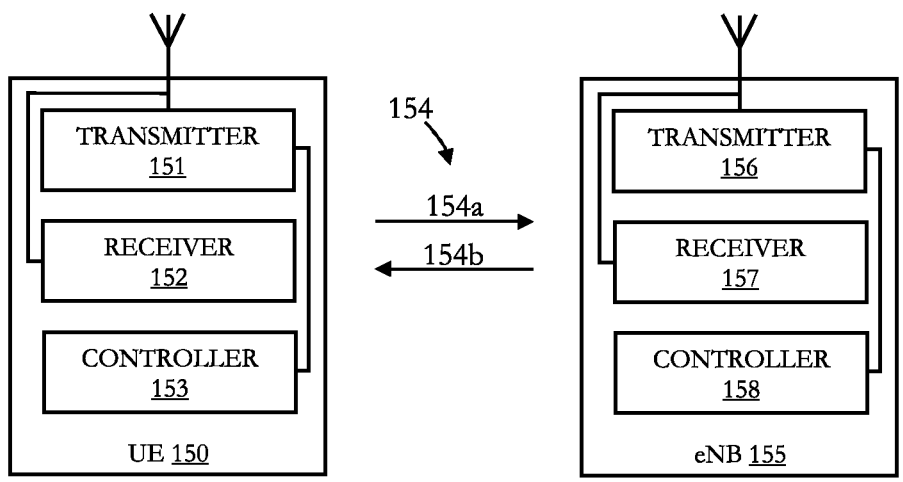
FIG. 11 depicts an embodiment of a user equipment and of a network node.

An embodiment of a user equipment UE 150 and an eNB 155 (or NR eNB/gNB) and a communications path 154 between the UE 150 and the eNB 155, which are used for implementing embodiments of the present disclosure, is discussed under reference of FIG. 11. The UE 150 is an example of a communication device and the eNB is an example of a base station (e.g. a network node), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154a, which is from the UE 150 to the eNB 155, and a downlink path 154b, which is from the eNB 155 to the UE 150.

During operation, the controller 153 of the UE 150 controls the reception of downlink signals over the downlink path 154b at the receiver 152 and the controller 153 controls the transmission of uplink signals over the uplink path 154a via the transmitter 151.

Similarly, during operation, the controller 158 of the eNB 155 controls the transmission of downlink signals over the downlink path 154b over the transmitter 156 and the controller 158 controls the reception of uplink signals over the uplink path 154a at the receiver 157.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering of 22 and 26 in the embodiment of FIG. 2 may be exchanged. Also, the ordering of 45 and 46 in the embodiment of FIG. 3 may be exchanged. Further, also the ordering of 82 and 84 in the embodiment of FIG. 6 may be exchanged. Other changes of the ordering of method steps may be apparent to the skilled person.

Please note that the division of the UE 150 into units 151 to 153 is only made for illustration purposes and that the present disclosure is not limited to any specific division of functions in specific units. For instance, the control XY could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network node comprising circuitry configured to:
request a home mobility service provider to allow a roaming mobility service for a passenger which is located in a mobility service area of a roaming mobility service provider.

(2) The communication network node of (1), wherein the requesting is based on a detection of the passenger in the mobility service area of the roaming mobility service provider.

(3) The communication network node of (2), wherein the detection is based on at least one of a mobile country code, geo-fencing, an external trigger, and a booking history.

(4) The communication network node of anyone of (1) to (3), the circuitry being further configured to:
perform a social login to the roaming mobility service provider.

(5) The communication network node of anyone of (1) to (4), wherein the allowing of a roaming mobility service is based on an identifier.

(6) The communication network node of (5), wherein the identifier is a decentralized identifier.

(7) The communication network node of anyone of (5) and (6), wherein the identifier is a self-sovereign identity.

(8) A method for controlling a communication network node comprising:
requesting a home mobility service provider to allow a roaming mobility service for a passenger which is located in a mobility service area of a roaming mobility service provider.

(9) The method of (8), further comprising:
performing a social login to the roaming mobility service provider.

(10) A communication network node comprising circuitry configured to:
request a decentralized database to provide a credential of a passenger, wherein the credential is generated based on a decentralized identifier of the passenger, wherein the decentralized identifier is generated based on a request of a user equipment to the decentralized database for allowing the passenger to use a mobility service of a roaming mobility service provider.

(11) The communication network node of (10), wherein the decentralized database is based on a distributed ledger.

(12) The communication network node of claim (11), wherein the distributed ledger is a blockchain.

(13) A user equipment comprising circuitry configured to:
issue a generation of a decentralized identifier of a passenger; and
receive a credential of the passenger for allowing the passenger to use a mobility service of a roaming mobility service provider, wherein the credential is generated based on a request of a home mobility service provider to a decentralized database and based on the decentralized identifier.

(14) The user equipment of (13), wherein the decentralized database is based on a distributed ledger.

(15) The user equipment of (14), wherein the distributed ledger is a blockchain.

(16) A communication network for providing a distributed ledger comprising a plurality of network nodes for authenticating a passenger to a roaming mobility service provider comprising circuitry configured to:
provide a decentralized identifier of the passenger in a decentralized database based on a request of a user equipment;
provide a credential of the passenger in the decentralized database based on a request of a home mobility service provider and based on the decentralized identifier; and
transmit the credential to the user equipment for allowing the passenger to use a mobility service of a roaming mobility service provider.

(17) The communication network of (16), wherein the decentralized database is based on a distributed ledger.

(18) The communication network of (17), wherein the distributed ledger is a blockchain.

(19) A method for controlling a communication network for providing a distributed ledger comprising a plurality of network nodes for authenticating a passenger to a roaming mobility service provider comprising:
providing a decentralized identifier of the passenger in a decentralized database based on a request of a user equipment;
providing a credential of the passenger in the decentralized database based on a request of a home mobility service provider and based on the decentralized identifier; and
transmitting the credential to the user equipment for allowing the passenger to use a mobility service of a roaming mobility service provider.

(20) A communication network node comprising circuitry configured to:
receive a credential of a passenger, wherein the credential is generated based on a request of a home mobility service provider to a decentralized database and based on a decentralized identifier of the passenger;
receive the decentralized identifier in response to transmitting the credential to a database;
verify the passenger based on the decentralized identifier for allowing the passenger to use a mobility service of a roaming mobility service provider.

(21) The communication network node of (20), wherein the verifying is based on a token.

(22) The communication network node of claim (21), wherein the token is based on a public key encryption of the decentralized identifier.

(23) A user equipment comprising circuitry configured to:
transmit a credential of a passenger, wherein the credential is generated based on a request of a home mobility service provider to a decentralized database and based on a decentralized identifier of the passenger;
receive a token, wherein the token is based on an encryption of the decentralized identifier; and decrypt the token for verifying the passenger to a roaming mobility service provider for allowing the passenger to use a mobility service of the roaming mobility service provider.

(24) The user equipment of (23), wherein the encryption is a public-key encryption.

(25) A communication network for providing a distributed ledger comprising a plurality of network nodes for authenticating a passenger to a roaming mobility service provider comprising circuitry configured to:
provide a token, wherein the token is based on an encryption of a decentralized identifier of the passenger; and
decrypt the token for verifying the passenger to a roaming mobility service provider for allowing the passenger to use a mobility service of the roaming mobility service provider.

(26) The communication network of (25), wherein the distributed ledger is based on a blockchain.

(27) A communication network node comprising circuitry configured to:
allow a passenger to use a mobility service of a roaming mobility service provider based on a credential of the passenger and based on a mutual agreement of the roaming mobility service provider and a home mobility service provider, wherein the credential is generated based on a request of the home mobility service provider to a decentralized database and based on a decentralized identifier of the passenger.

(28) A method for controlling a communication network node comprising:
allowing a passenger to use a mobility service of a roaming mobility service provider based on a credential of the passenger and based on a mutual agreement of the roaming mobility service provider and a home mobility service provider, wherein the credential is generated based on a request of the home mobility service provider to a decentralized database and based on a decentralized identifier of the passenger.

(29) A communication network node comprising circuitry configured to:
store a plurality of credentials of a passenger, wherein the plurality of credentials is generated based on a request of a home mobility service provider to a decentralized database and based on a decentralized identifier of the passenger; and
transmit at least one credential of the plurality of credentials to a user equipment for allowing the passenger to use a mobility service of a roaming mobility service provider.

(30) A method for controlling a communication network node comprising:
storing a plurality of credentials of a passenger, wherein the plurality of credentials is generated based on a request of a home mobility service provider to a decentralized database and based on a decentralized identifier of the passenger;
transmitting at least one credential of the plurality of credentials to a user equipment for allowing the passenger to use a mobility service of a roaming mobility service provider.

The invention claimed is:

1. A communication network node comprising:
circuitry configured to:
send a request to a home transportation service provider that is a transportation organization in which a passenger has a predefined relationship, wherein
the request is a request to allow a roaming transportation service for the passenger which is located in a transportation service area of a roaming transportation service provider that is a transportation organization in which the passenger does not have the predefined relationship,
the allowing of the roaming transportation service is based on an identifier, and
the identifier is a decentralized identifier.

2. The communication network node of claim 1, wherein the request is based on a detection of the passenger in the transportation service area of the roaming transportation service provider.

3. The communication network node of claim 2, wherein the detection is based on at least one of a mobile country code, geo-fencing, an external trigger, and a booking history.

4. The communication network node of claim 1, the circuitry being further configured to:
perform a social login to the roaming transportation service provider.

5. The communication network node of claim 1, wherein the decentralized identifier is a self-sovereign identity.

6. A method for controlling a communication network node comprising:
sending a request to a home transportation service provider that is a transportation organization in which a passenger has a predefined relationship, wherein
the request is a request to allow a roaming transportation service for the passenger which is located in a transportation service area of a roaming transportation service provider that is a transportation organization in which the passenger does not have the predefined relationship,
the allowing of the roaming transportation service is based on an identifier, and
the identifier is a decentralized identifier.

7. The method of claim 6, further comprising:
performing a social login to the roaming transportation service provider.

8. A communication network node comprising:
circuitry configured to:
request a decentralized database to provide a credential of a passenger,
wherein the credential is generated based on a decentralized identifier of the passenger, the decentralized identifier of the passenger being an identifier that is globally unique and does not depend on a centralized authority, and wherein
the decentralized identifier is generated based on a request of a user equipment sent to the decentralized database, and
the request of the user equipment is a request for allowing the passenger to use a transportation service of a roaming transportation service provider that is a transportation organization in which the passenger does not have a predefined relationship.

9. The communication network node of claim 8, wherein the decentralized database is based on a distributed ledger.

10. The communication network node of claim 9, wherein the distributed ledger is a blockchain.

11. A user equipment comprising circuitry configured to:
issue a generation of a decentralized identifier of a passenger, the decentralized identifier of the passenger being an identifier that is globally unique and does not depend on a centralized authority; and
receive a credential of the passenger for allowing the passenger to use a transportation service of a roaming transportation service provider that is a transportation organization in which the passenger does not have a predefined relationship,
wherein the credential is generated based on a request of a home transportation service provider that is a transportation organization in which the passenger has the predefined relationship sent to a decentralized database and based on the decentralized identifier.

12. The user equipment of claim 11, wherein the decentralized database is based on a distributed ledger.

13. A method for controlling a communication network for providing a distributed ledger comprising a plurality of network nodes for authenticating a passenger to a roaming transportation service provider, the method comprising:
providing a decentralized identifier of the passenger in a decentralized database based on a request of a user equipment, the decentralized identifier of the passenger being an identifier that is globally unique and does not depend on a centralized authority;
providing a credential of the passenger in the decentralized database based on a request of a home transportation service provider that is a transportation organization in which the passenger has a predefined relationship and based on the decentralized identifier; and
transmitting the credential to the user equipment for allowing the passenger to use a transportation service of the roaming transportation service provider that is a transportation organization in which the passenger does not have the predefined relationship.

14. A communication network node comprising circuitry configured to:
receive a credential of a passenger, wherein the credential is generated based on a request of a home transportation service provider that is a transportation organization in which the passenger has a predefined relationship sent to a decentralized database and based on a decentralized identifier of the passenger, the decentralized identifier of the passenger being an identifier that is globally unique and does not depend on a centralized authority;
receive the decentralized identifier in response to transmitting the credential to a database; and
verify the passenger based on the decentralized identifier for allowing the passenger to use a transportation service of a roaming transportation service provider that is a transportation organization in which the passenger does not have the predefined relationship.

15. The communication network node of claim 14, wherein the verifying is based on a token.

16. The communication network node of claim 15, wherein the token is based on a public key encryption of the decentralized identifier.

\* \* \* \* \*